Patented Oct. 15, 1946

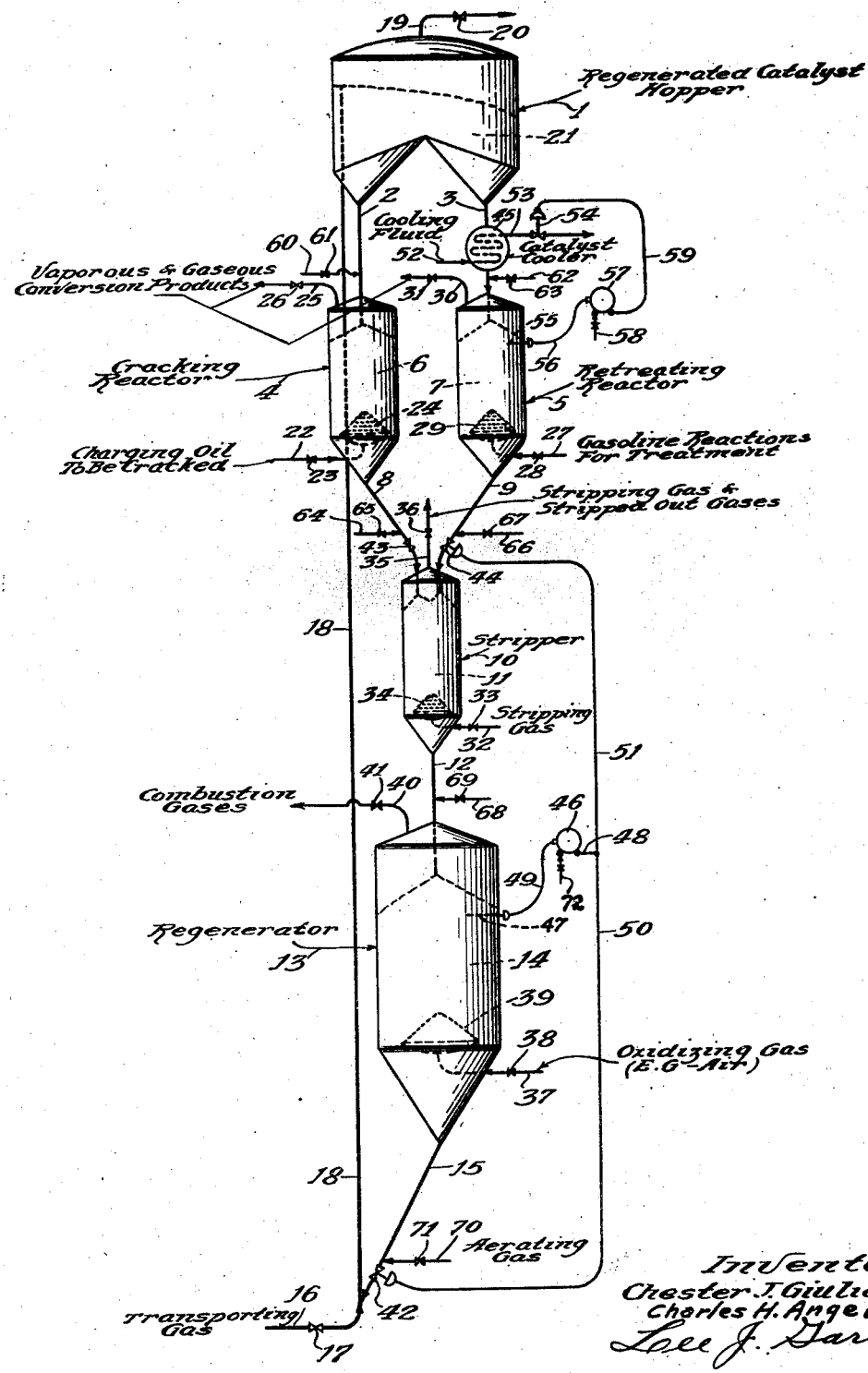

2,409,353

UNITED STATES PATENT OFFICE 2,409,353

CONVERSION OF HYDROCARBONS

Chester J. Giuliani and Charles H. Angell, Chicago, Ill., assignors to Universal Oil Products Company, Chicago, Ill., a corporation of Delaware Application July 24, 1944, Serial No. 546,264

3 Claims. (Cl. 196—52)

The invention is directed to an improved process for the catalytic conversion of fluid hydrocarbons and is more particularly concerned with a two-stage operation in which hydrocarbon oil heavier than gasoline is catalytically cracked to produce substantial yields of gasoline and wherein all or a selected fraction of the gasoline thus produced is reformed or retreated in the presence of cracking catalyst to improve its quality. Alternatively, the gasoline or gasoline fractions subjected to such reforming or retreatment may be derived from an external source or may comprise gasoline or gasoline fractions produced in the cracking step of the same system and hydrocarbons of similar characteristics from an external source.

The process herein provided employs separate confined reaction zones for the catalytic reforming or retreatment of gasoline or selected gasoline fractions and for catalytic cracking of the heavier charging oil to produce gasoline. Both reaction zones are operated continuously with a separate stream of active solid catalyst particles continuously supplied to each and with a separate stream of contaminated catalyst particles continuously withdrawn from each reaction zone. The streams of contaminated catalyst particles are commingled and supplied to a confined regenerating zone wherein the activity of the catalyst is restored to the desired relatively high value by burning therefrom combustible contaminants accumulated thereby in the reaction and retreating zones. The resulting regenerated catalyst is then returned, in part, to the cracking reactor and, in part, to the retreating reactor for further use in promoting the cracking and the retreating or reforming operation in these respective zones, thus completing the catalyst circuit through the system.

The catalyst employed in the present process may comprise any of the several well known solid cracking catalysts which are also suitable for the reforming or retreatment of olefin-containing gasoline or gasoline fractions to improve their quality with respect to octane rating, bromine number, blending value, susceptibility to antiknock agents such as lead tetraethyl or some combination of these improvements. Such catalysts generally comprise a major proportion of silica and a minor proportion of one or more metal oxides such as alumina, zirconia and magnesia. There are several methods by which such catalysts may be synthesized and it is also within the scope of the invention to employ partially synthetic or natural catalysts of this general type. Best results are ordinarily obtained, particularly in the reforming or retreating step, with catalysts which are prepared entirely or partially by synthetic methods. The solid catalyst particles are preferably in the form of granules of regular or irregular shape (preferably substantially spherical). However, it is also within the scope of the invention to employ more finely divided catalyst particles, the choice of particle size depending primarily upon the physical condition which it is desired to maintain in the catalyst beds in the reaction and regenerating vessels.

The novel features of the invention are particularly advantageous as applied to operations of the type in which a relatively compact bed of moving granular catalyst particles is maintained in the reaction zone. However, we also contemplate an operation of the type in which a relatively dense and turbulent fluid-like bed of finely divided catalyst particles is maintained in the reaction zone. The condition of the catalyst bed in the regenerating zone may be similar to that maintained in the reaction zones or, when desired, relatively compact beds may be maintained in the reaction zones and a fluid-like bed maintained in the regenerating zone or vice versa.

Aside from the particular catalyst employed and the characteristics of the oil to be converted, the important factors which influence the conversion reactions in an operation of the general type above outlined are temperature, pressure, space velocity and catalyst-oil ratio. The term "space velocity" as here used refers to the volume or weight of hydrocarbons passed through the reaction zone in a given time per unit volume or weight of catalyst present therein. It is usually expressed on a weight hourly basis (i. e., pounds of reactants per hour, per pound of catalyst). The term "catalyst-oil ratio" as here used refers to the quantity or weight of oil supplied to the reaction zone per unit quantity or weight of oil supplied thereto in a given time. It is usually expressed on a weight basis (i. e., pounds of catalyst per pound of oil).

In an operation of the fluid bed type or of the compact moving bed type the quantity of combustible contaminants accumulated by the catalyst in passing through the reaction zone varies in direct relation with the extent to which the oil undergoing treatment is converted in this zone. In cracking heavier oil for the production of gasoline, the combustible deposits on the catalyst will increase with an increased yield of gasoline. In the catalytic reforming or retreatment of gasoline or gasoline fractions to improve their quality, the quantity of combustible contaminants deposited on the catalyst per unit volume of oil treated is considerably less than that encountered in the cracking of higher boiling oil to produce a satisfactory yield of gasoline.

The quantity of combustible contaminants deposited on the catalyst in the reaction zone and burned therefrom in the regenerating zone determines the thermal balance or lack of thermal balance between the reaction and regenerating steps, in the absence of provision for abstracting excess heat or supplying additional heat to the system. When an inherent thermal balance exists between the reaction and regenerating steps, the heat stored in the catalyst during its regeneration and supplied therewith to the reaction zone corresponds to the heat required for conducting the endothermic hydrocarbon conversion reaction in the latter zone. This condition usually does not prevail. The quantity of combustible contaminants accumulated by the catalyst in promoting the cracking of most higher boiling oil to produce a satisfactorily high yield of gasoline is usually more than that which will result in thermal balance between the reaction and regenerating steps. On the other hand, the quantity of combustible contaminants accumulated by the catalyst in promoting the reforming or retreatment of most gasoline and gasoline fractions is less than that required for thermal balance between the reaction and regenerating steps.

It will be apparent from the above that the two-stage operation herein provided in which relatively heavy oil is cracked to produce a satisfactorily high yield of gasoline in one reaction zone, while gasoline or gasoline fractions are reformed or retreated in a separate concomitantly operated reaction zone, the contaminated catalyst from the two reaction zones commingled and regenerated in a common regenerating zone and the regenerated catalyst returned, in part, to each of the reaction zones, will result in a closer approach to thermal balance between the reaction and regenerating steps. The cracking step will give an excess catalyst deposit for thermal balance. The reforming or retreating step will give a deficiency of catalyst deposit for thermal balance. When the two steps are operated simultaneously as herein provided, the average catalyst deposit will at least approach that required for thermal balance between the regenerating step and the two reaction steps.

Of the important operating variables above mentioned, the temperature and pressure employed in the reaction zone and the space velocity are relatively critical for producing a given yield and quality of gasoline from any specific charging stock with a given catalyst. Of course, any one of these three factors may be varied within reasonable limits since various correlations of the three will produce satisfactory results. However, the fourth important factor, namely catalyst oil ratio, has a greater range of flexibility. This is employed to advantage in the present process to maintain the desired temperature relationship between the regenerating step and each of the reaction steps.

In operating the process of the invention, catalyst withdrawn from the regenerating step is supplied to the cracking reactor at a temperature and at a rate regulated to supply substantially all of the endothermic heat of cracking in this zone without encountering an excessive decrease in the temperature of the catalyst as it passes therethrough. Additional catalyst withdrawn from the regenerator is supplied to the retreating reactor, preferably at a somewhat lower temperature than that at which the regenerated catalyst is supplied to the cracking reactor and at a rate so regulated that when the relatively clean and relatively cool catalyst from the retreating reactor is commingled with the relatively hot and more highly contaminated catalyst withdrawn from the cracking reactor and the commingled stream of catalyst is returned to the regenerator, it may be regenerated therein and withdrawn therefrom at a temperature substantially corresponding to that desired for the catalyst entering the cracking reactor. Thus, the retreating or reforming stage of the process through which catalyst is circulated serves as a cooling step from which relatively clean and relatively cool catalyst is obtained for reducing the temperature and quantity of combustible deposits in the commingled stream of catalyst entering the regenerating zone, as compared with the temperature and quantity of combustion deposits in the stream of catalyst leaving the cracking reactor. This dilution and cooling is maintained at the desired value by controlling the rate at which catalyst is passed through the retreating reactor.

To operate the retreating reactor at a lower temperature than the cracking reactor, provision is made for abstracting heat from the catalyst being returned from the regenerating step to the retreating reactor. This may be accomplished by passing that portion of the catalyst supplied to the retreating step through a suitable heat exchanger in indirect contact and heat transfer relation with any desired cooling fluid and, in the preferred embodiment of the invention, the temperature of the catalyst entering the retreating reactor is kept at a substantially constant value by varying the quantity of cooling fluid passed through this catalyst cooling step in response and in direct relation to minor variations in the temperature of the catalyst leaving the cooling step and entering the retreating reactor. This permits variation in the quantity of catalyst circulated from the regenerator through the retracting reactor and back to the regenerator to compensate for other variations in the operating conditions, such as, for example, in the temperature of the catalyst leaving the cracking reactor, and thus maintain a catalyst temperature in the regenerator at the desired substantially constant value.

The accompanying drawing is a diagrammatic illustration of one specific form of apparatus in which the improved mode of operation provided by the invention may be successfully conducted and the operation of the process will now be described with reference to the drawing.

The apparatus illustrated in the drawing comprises a separating vessel and hopper 1 for regenerated catalyst, which is supplied thereto as will be later described. Separate streams of the regenerated catalyst are supplied from vessel 1 through conduits 2 and 3 into cracking reactor 4 and retreating reactor 5, respectively.

A relatively compact bed 6 of the catalyst particles is maintained in cracking reactor 4 and a similar relatively compact bed 7 of the catalyst particles is maintained in the retreating reactor 4, in the case illustrated.

Catalyst which has promoted the cracking reaction in reactor 4 and become contaminated with combustible deposits is directed from the lower portion of this reactor through conduit 8 into stripping vessel 10. Catalyst which has been employed to promote the retreating or reforming reaction in reactor 5 and which is cooler and less highly contaminated with combustible deposits than the catalyst withdrawn from reactor 4 is directed through conduit 9 into the stripping vessel 10. In stripper 10 another relatively compact bed 11 of catalyst particles is maintained and in passing through this zone is substantially stripped of occluded and adsorbed volatile hydrocarbons, as will be later described.

Substantially stripped catalyst is directed from the lower portion of stripper 10 through conduit 12 into regenerator 13 wherein another relatively compact bed 14 of the catalyst particles is maintained. The catalyst is regenerated, as will be later described, to restore its activity by burning combustible deposits therefrom as it passes through regenerator 13. A substantial portion of the heat of regeneration is stored in the catalyst particles as they pass through the regenerator and resulting hot regenerated catalyst is directed from the lower portion of the regenerating vessel through conduit 15 into a gas-lift transfer line 18 wherein it is commingled with an incoming stream of transporting gas supplied through line 16 and valve 17. The transporting fluid exerts a gas-lift action on the catalyst particles with which it is commingled in transfer line 18 and effects their return through the gas-lift transfer line to the separating vessel and catalyst hopper 1.

In vessel 1 the velocity of the commingled stream of transporting fluid and catalyst particles is materially reduced to effect the substantial separation by gravitation of the catalyst particles. The transporting gas is discharged from the upper portion of vessel 1 through line 19 and valve 20 and the separated catalyst particles collect within the hopper-like lower portion of vessel 1 in the form of a relatively compact bed 21 from which they are returned, in part, through the cracking reactor and, in part, through the retreating reactor, as previously described, to the regenerator.

Hydrocarbon oil heavier than gasoline to be catalytically cracked is supplied preferably in preheated essentially vaporous state to the cracking reactor 4 through line 22, valve 23 and a suitable distributing member 24 disposed in the lower portion of the reactor. The hydrocarbon vapors pass upwardly from distributing member 24 into the relatively compact catalyst bed 6 and are cracked to the desired degree in passing upwardly through the bed under the controlled conditions of temperature, pressure and space velocity maintained in this zone. Vaporous and gaseous conversion products are discharged from the upper extremity of bed 6 into the space provided thereabove within reactor 4 and are thence directed through line 25 and valve 26, preferably to suitable fractionating and recovery equipment which does not constitute a novel part of the invention and is not illustrated.

Gasoline or gasoline fractions to be retreated, and which may be derived from an external source or may comprise gasoline or gasoline fractions produced in the cracking step of the process and separated from the other cracked products, is supplied preferably in preheated essentially vaporous state through line 27, valve 28 and a suitable distributing member 29 into bed 7 in the retreating reactor 5. In passing upwardly through bed 7, the gasoline fractions are reformed or retreated to effect a material improvement in their quality and resulting vaporous and gaseous products are discharged from the upper portion of bed 7 into the space provided thereabove in reactor 5. They are thence directed through line 30 and valve 31 to suitable fractionating and recovery equipment preferably separate from that to which vaporous products from the cracking reactor 4 are supplied, particularly in case the gasoline for retreatment is derived from the cracking step.

The streams of catalyst particles passing from reactors 4 and 5 to stripper 10 will carry occluded and adsorbed volatile hydrocarbons which, if left in the catalyst stream supplied to the regenerator, would be destroyed by burning in this zone and which would materially increase the heat evolved in the regenerating step. To recover these valuable light hydrocarbons they are substantially stripped from the catalyst before it enters the regenerator. To accomplish this, suitable stripping gas, such as steam, for example, is supplied to the lower portion of the stripper through line 32, valve 33 and a suitable distributing member 34 and is directed upwardly through bed 11 in the stripper countercurrent to the general downward movement of catalyst particles through the bed. Stripping gas and resulting stripped-out volatile hydrocarbons are discharged from the upper portion of bed 11 into the space maintained thereabove within the stripping vessel. They are thence directed through line 35 and valve 36, preferably to suitable separating and recovery equipment, not illustrated, but which may, for example, be the same fractionating and recovery equipment to which vaporous products from the cracking reactor or vaporous products from the retreating reactor are supplied.

In passing downwardly through the bed 14 in the regenerator the catalyst particles are regenerated and heated by burning therefrom combustible deposits accumulated in the cracking and retreating reactors. This is accomplished by directing oxidizing gas, such as air, for example, through line 37, valve 38 and a suitable distributing member 39 upwardly into bed 14 in the regenerator countercurrent to the downwardly moving catalyst particles within the bed. Resulting gaseous products of combustion are discharged from the upper portion of bed 14 into the space provided thereabove within the regenerator. They are thence discharged through line 40 and valve 41, preferably to suitable heat recovery equipment, not illustrated, such as, for example, a waste-heat boiler, steam superheater, hot gas turbine or the like for utilization of the readily available heat energy in these gases.

In passing from the regenerator through conduit 15 into the gas-lift transfer line 18, the over-all rate of catalyst circulation through the system is controlled by the adjustment of valve 42 which is disposed in conduit 15 adjacent the discharge end of the latter. Preferably, as in the case illustrated, the opening through this valve is varied in direct relation to changes in the rate at which catalyst is passed through the retreating reactor in order that the rate of catalyst circulation through the cracking reactor may be fixed at the desired value by the adjustment of valve 43 in conduit 8 and the over-all rate of catalyst circulation through the system adjusted to accommodate the increase or decrease in its rate of passage through the retreating reactor. Then, to complete the control, the rate of catalyst circulation through the retreating reactor is varied by the adjustment of valve 44 in conduit 9 in response and in direct relation to minor changes in the temperature of the catalyst within or entering the regenerator, so as to keep the regenerator temperature substantially constant, and the rate at which cooling fluid is circulated through the catalyst cooler 45, which is provided in conduit 3, is varied in response and in direct relation to minor variations in the temperature of the catalyst within or entering the retreating reactor so as to keep the temperature in this zone substantially constant.

Provision is made in the case illustrated for correlating the adjustment of valves 42 and 44 in the respective conduits 15 and 9 by automatically operating both of these valves through a suitable controller 46 receiving impulses from a thermocouple or other suitable temperature-sensitive device 47 which, in the case illustrated, is disposed within bed 14 in the regenerator and preferably adjacent the upper end of the bed. Alternatively, when desired, this thermocouple 47 may be disposed in conduit 12 or in the intermediate or lower portion of the catalyst bed in the regenerator. Any suitable form of controller capable of effecting the adjustment of valves 42 and 44 in response and in direct relation to minor changes in the temperature of the catalyst at the point of measurement may be employed. In the case illustrated the controller is of the air-operated type receiving input air at substantially constant pressure through line 72 and receiving impulses for varying the air pressure in the outlet line 48, from the thermocouple 47 through line 49. Lines 50 and 51, each communicating at one end with the air output line 48 from the controller, communicate at their opposite ends with the diaphragms of the respective automatic control valves 42 and 44. When the temperature of the catalyst as determined by thermocouple 47 increases, the controller functions to increase the opening through valve 44 and to correspondingly increase the opening through valve 42, thus increasing the rate of catalyst circulation through the retreating reactor and increasing the overall rate of catalyst circulation through the system by a corresponding amount. Thus, more of the relatively cool and less highly contaminated catalyst from the retreating reactor enters the regenerator to reduce the temperature of the latter to the desired value. When the temperature in the regenerator recedes, controller 46 functions to reduce the openings through the valves 42 and 44 so that a smaller quantity of catalyst is passed through the retreating reactor and through the regenerator, thus allowing the temperature in the latter to increase to the desired value.

In order that the temperature in the retreating step may be kept substantially constant regardless of variations in the rate at which catalyst is passed through this zone, and in order to permit operation of the retreating step, when desired, at a lower temperature than that employed in the cracking step conducted in reactor 4, suitable cooling fluid such as steam, water, oil or the like is supplied to cooler 45 through line 52, passed in indirect contact and heat exchange relation with the catalyst about to enter the retreating step and discharged from the cooler through line 53 at a rate regulated by the adjustment of valve 54 in this line. To make this control automatic, a thermocouple or other suitable temperature-sensitive device 55 is disposed, in the case illustrated, within the upper portion of the catalyst bed 7 in the retreating reactor and transmits impulses through line 56 to controller 57. This controller is also of the air-operated type, in the case illustrated, receiving input air at substantially constant pressure through line 58 and transmitting air pressure through line 59 to the diaphragm of the automatic control valve 54 at a magnitude which varies in response and in direct relation to minor variations in the temperature prevailing at the thermocouple 55. Thus, when the temperature in the retreating reactor increases, controller 57 functions to increase the opening through valve 54 and permit the passage of cooling fluid through cooler 45 at an increased rate, thus bringing the temperature of the catalyst entering the retreating reactor back to the desired lower value. Conversely, when the temperature in the retreating step decreases, controller 57 functions to restrict the opening through valve 54, thus reducing the rate at which cooling fluid is passed through cooler 45 and bringing the temperature of the catalyst entering the retreating reactor back to the desired higher value.

It will be apparent from the above that, with the system of control provided in conjunction with the two-stage operation of the process, substantial thermal balance within the system is obtained and maintained by controlling the rate at which catalyst is passed through the retreating step, controlling the over-all rate of catalyst circulated through the system to accommodate variations in the rate at which it is passed through the retreating step and operating the retreating step at a somewhat lower temperature than that prevailing in the cracking step.

Aerating lines 60, 62, 64, 66, 68 and 70, containing the respective valves 61, 63, 65, 67, 69 and 71 and communicating with the respective conduits 2, 3, 8, 9, 12 and 15 are provided in the case illustrated for the introduction of suitable aerating gas such as steam, for example, into the columns of catalyst particles passing through the respective lines at a rate regulated to prevent excessive compaction of the columns and insure movement of the catalyst through these conduits. The aerating gas passes largely in an upward direction through the catalyst columns to which it is introduced and creates a gas pressure within the respective conduits which is somewhat less than the pressure exerted by the catalyst column at the lower or catalyst discharge end of the respective conduits but slightly higher than that at their upper or catalyst inlet ends.

The transporting gas supplied to line 18 through lines 16 and 17 may be chosen to suit requirements and may comprise, for example, steam, air, relatively inert gas, such as carbon dioxide or combustion gases substantially devoid of air, and it is possible to make use of incoming vaporous reactants to be converted in either the cracking or retreating step, outgoing vaporous products from either of these steps, incoming air for subsequent use as regenerating gas in regenerator 13 or outgoing combustion gases from the regenerator as the transporting fluid in transfer line 18.

We claim as our invention:

1. The process of catalytically cracking hydrocarbon oil heavier than gasoline and simultaneously treating gasoline fractions with cracking catalyst to improve their quality, which comprises continuously supplying separate streams of active cracking catalyst particles to separate confined reaction zones, contacting the catalyst in one of said zones with said oil to be cracked and therein effecting the cracking reaction, contacting the catalyst in the other of said zones with said gasoline fractions and therein effecting their conversion to a product of improved quality at a temperature lower than that employed in said cracking operation, removing a stream of resultant contaminated catalyst particles from each of said reaction zones, supplying both streams to a common regenerating zone, therein regenerating the catalyst by an exothermic reaction, returning resultant regenerated catalyst, containing heat stored therein in the regenerating step, in part to the cracking reactor at a temperature relatively close to that desired for conducting said cracking reaction, and in part to the other reactor at a lower temperature relatively close to that desired for said treatment of gasoline fractions, and controlling the rate at which catalyst is passed through the last-named reactor in response and in direct relation to temperature variations in the regenerating step to maintain a substantially constant temperature in the regenerating zone, and supplying, in the catalyst entering the cracking reactor, substantially all of the heat of endothermic reaction required in the latter zone.

2. A process for the simultaneous cracking of hydrocarbon oil heavier than gasoline and improvement of gasoline fractions in the presence of cracking catalyst, which comprises regenerating contaminated cracking catalyst in a regenerating zone by burning combustible contaminants therefrom, removing heated regenerated catalyst from said zone and supplying a portion thereof, while in heated condition, to a cracking zone, introducing the oil heavier than gasoline to the cracking zone and therein cracking the same in contact with said portion of the regenerated catalyst, supplying another portion of said regenerated catalyst, to a retreating zone, introducing said gasoline fractions to the retreating zone and therein contacting the same with said other portion of the regenerated catalyst at lower conversion temperature than that at which the heavier oil is cracked in the cracking zone, removing contaminated catalyst from the cracking zone and from the retreating zone and supplying the same to said regenerating zone, and controlling the rate of catalyst circulation through the retreating zone in response and in direct relation to minor variations in the temperature of the catalyst undergoing regeneration to maintain a substantially constant regenerating temperature in the regenerating zone.

3. The process as defined in claim 2 further characterized in that said gasoline fractions comprise cracked products produced from said heavier oil in the cracking zone.

CHESTER J. GIULIANI.
CHARLES H. ANGELL.